Nov. 14, 1967  L. E. JOHNSON  3,352,385
HYDRODYNAMIC RETARDER
Filed Nov. 22, 1965  2 Sheets-Sheet 2
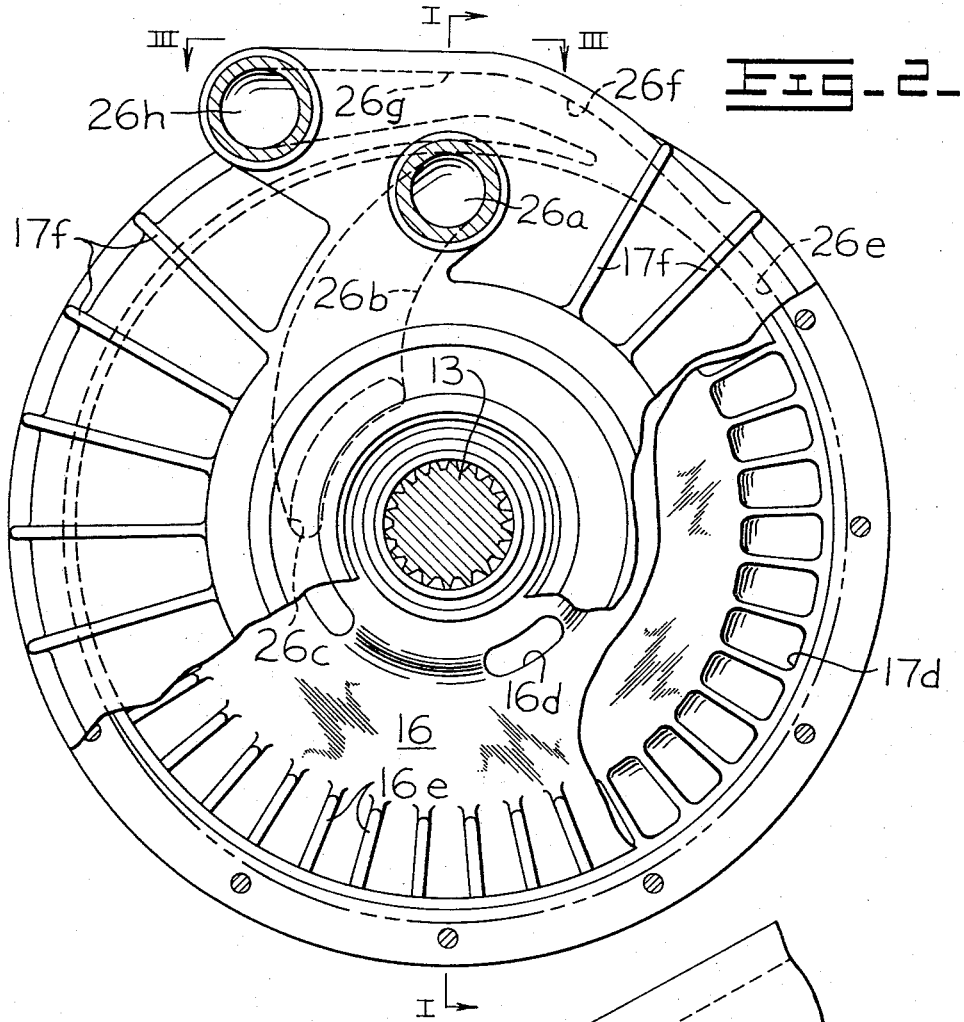
Fig-2-
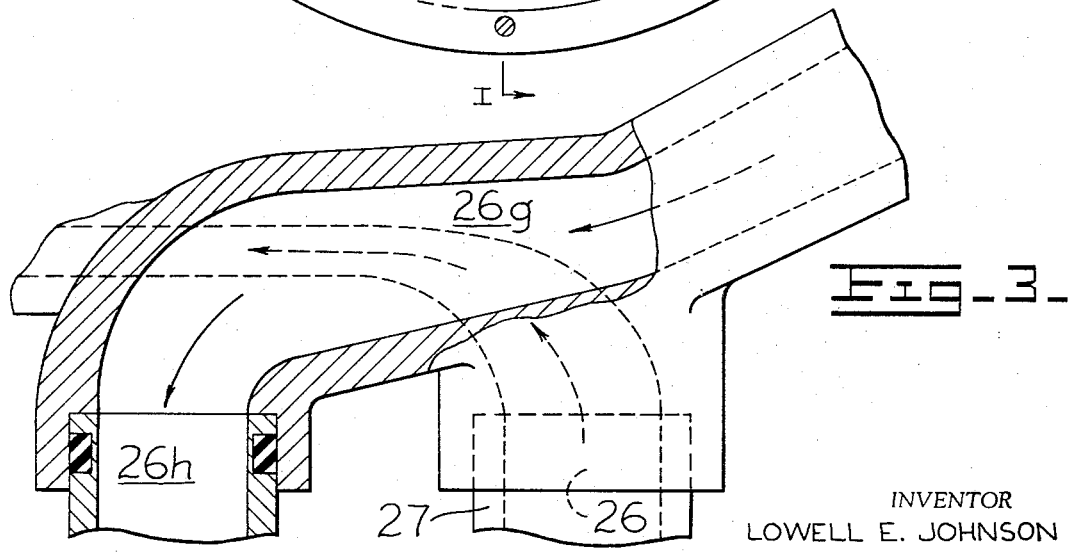
Fig-3-
INVENTOR
LOWELL E. JOHNSON
BY
Fryer, Gerewold, Feix & Phillips
ATTORNEYS

United States Patent Office 3,352,385
Patented Nov. 14, 1967

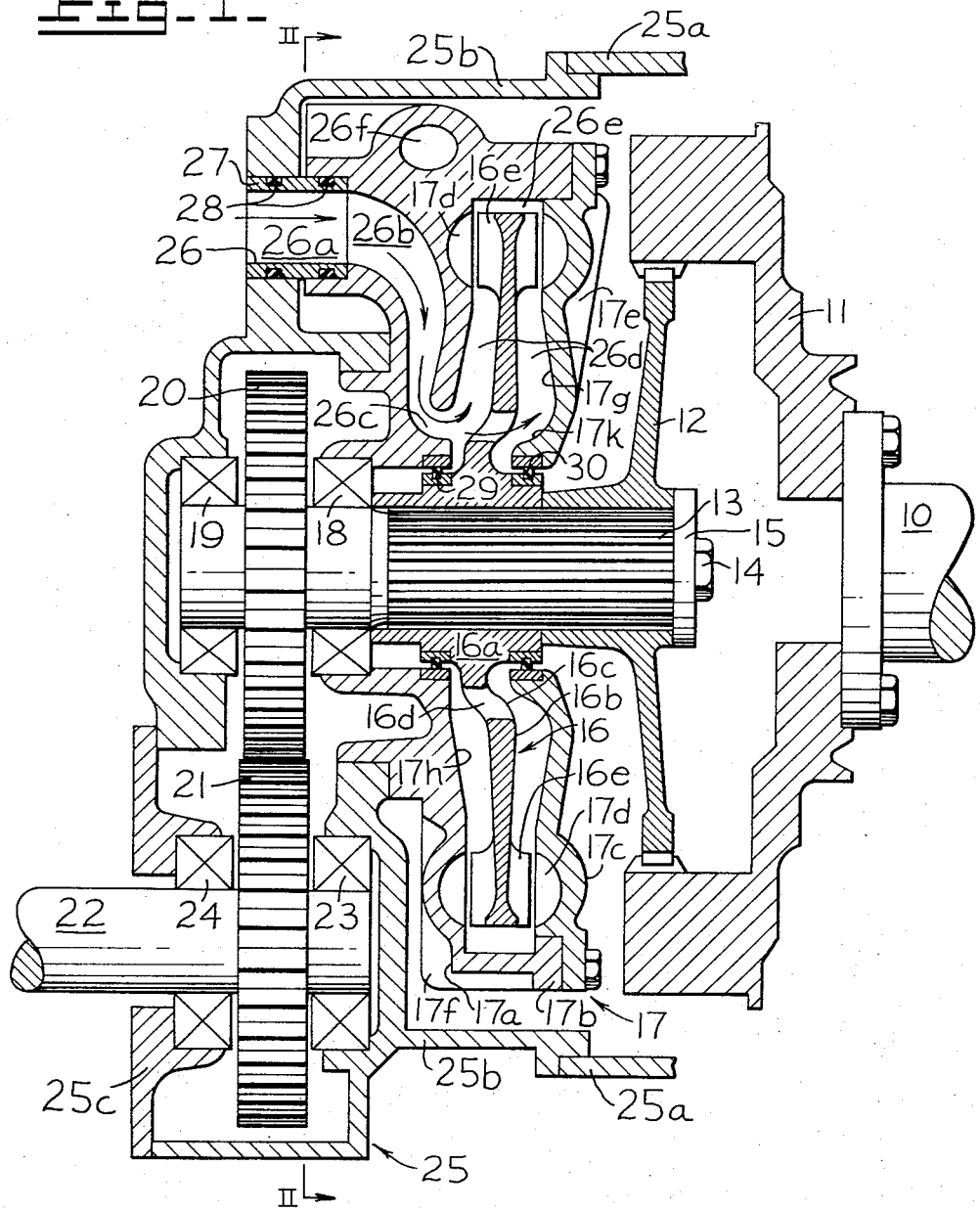

3,352,385
HYDRODYNAMIC RETARDER
Lowell E. Johnson, East Peoria, Ill., assignor to Caterpillar Tractor Co., Peoria, Ill., a corporation of California
Filed Nov. 22, 1965, Ser. No. 508,890
11 Claims. (Cl. 188—90)

ABSTRACT OF THE DISCLOSURE

A hydrodynamic retarder comprising a bladed rotor and juxtaposed stator pockets operatively arranged between an engine drive shaft and an output shaft of a ground-engaging vehicle, said retarder preferably including a constant cross section inlet passage means formed in the retarder housing to selectively charge the retarder with fluid for transmission braking purposes.

---

The invention relates to a hydrodynamic retarder and more particularly relatives to a hydrodynamic retarder adapted to be incorporated into a land vehicle for effecting a selective braking thereof.

The trend towards larger earth moving vehicles, such as articulated wheel tractor scrapers, dictates that attention be directed towards increasing the braking capacity thereof. One approach to this problem is to utilize a hydrodynamic retarder to supplement the braking capacity afforded by conventional service brakes. It is desirable that the retarder operate in an efficient manner and be compactly arranged in a vehicle to facilitate installation and servicing.

This invention is drawn to a dynamically balanced hydrodynamic retarder for land vehicles constructed and arranged to afford efficient fluid circulation therethrough during braking. In addition, the retarder constitutes a non-complex integration of working parts to facilitate installation and servicing. The retarder essentially comprises a bladed rotor arranged to rotate adjacent a plurality of radially disposed stator pockets to effect the braking function and fluid passage means for circulating fluid therethrough in an efficient manner. Novel aspects of this invention comprise a system of fluid passages having substantially constant flow areas to alleviate fluid turbulence, cavitation and noise problems, a dynamically balanced rotor and a multi-part housing adapted for expeditious assembly, disassembly and servicing.

In accordance with the above discussions, an object of this invention is to provide a hydrodynamic retarder comprising fluid passage means constructed and arranged to afford efficient fluid circulation therethrough.

Another object of this invention is to provide a power transfer system comprising a hydrodynamic retarder having a rotor dynamically balanced therein.

A further object of this invention is to provide a hydrodynamic retarder comprising a multi-part housing arranged to facilitate installation and servicing thereof.

Other and more specific objects of this invention will become apparent from the following description and accompanying drawing wherein:

FIG. 1 is a cross-sectional view of the preferred hydrodynamic retarder assembly of this invention taken in the direction of arrows I—I in FIG. 2;

FIG. 2 is a cross-sectional view taken in the direction of arrows II—II in FIG. 1 with parts broken away for clarification purposes; and FIG. 3 is a view taken in the direction of arrows III—III in FIG. 2.

Referring to FIG. 1, an engine driven input shaft 10 is suitably arranged to drive a flywheel 11. A gear 12 is preferably splined to the flywheel and a rotatable rotor shaft 13 to facilitate assembly and disassembly. A bolt 14 and a washer 15 may be utilized in the manner illustrated to prevent rightward, axial movement of gear 12.

A rotor 16 is suitably splined to shaft 13 and comprises a hub portion 16a, a radially disposed web portion 16b and a curved portion 16c connecting the hub and web portions. As illustrated, the curved portion is arranged to locate the web portion in axially offset relationship with respect to the location whereat the curved portion connects to the hub portion.

The curved portion has a plurality of arcuately shaped apertures 16d formed therein, radially disposed about the axis of rotor shaft 13. A plurality of blades 16e are secured radially outwardly on opposite sides of the web portion to effect retardation in a manner hereinafter explained.

A fixed housing 17 is arranged to substantially enclose the rotor and comprises a cup-shaped portion 17a having a flange portion 17b circumventing the rotor and secured to a plate portion 17c. A first and second series of juxtaposed stator cups or pockets 17d are constructed and arranged on the cup and plate portions, respectively, to cooperate with the juxtaposed rotor blades to effect retardation when fluid is communicated therein. Radially disposed fins 17e and 17f are arranged to transfer heat generated in the retarder chamber to a surrounding medium and afford structural integrity to housing 17.

The leftward end of rotor shaft 13 is mounted in conventional bearing means, preferably arranged in spaced relationship at 18 and 19. The inner race of bearing 18 and the hub portion of gear 12 maintain the rotor in axially aligned position in the manner illustrated. The rotor is preferably mounted substantially midway between bearing 18 of the bearing means and the location whereat input shaft 10 drives rotor 16, and is spaced midway between stator pockets 17d for the purpose of balancing hydrodynamic thrusts.

A transfer gear 20 is suitably mounted on rotor shaft 13 between bearings 18 and 19 to mesh with and drive a gear 21. Gear 21 is suitably secured to an output shaft 22 which in turn serves as a power path to the vehicle transmission (not shown) and bevel gear system (not shown) associated with tractor wheels, for example. Output shaft 22 is mounted for rotation in conventional bearings 23 and 24.

A multi-part second housing 25 is arranged to enclose the first housing 17 and the above power transfer mechanisms. The second housing preferably comprises integrated and detachable parts 25a, 25b, and 25c. The parts constituting housings 17 and 25 may be suitably secured togtther by conventional bolt means or the like to facilitate assembly and disassembly of the integrated unit.

A passageway 26 for circulating a braking fluid through the retarder chamber will now be explained. A first passage means thereof comprises an inlet 26a, preferably formed by a cylindrical tube 27 mounted in housings 17 and 25. Suitable ring seals 28 are arranged to prevent fluid leakage thereby.

The first passage means further comprises a curved portion 26b communicating the circularly shaped inlet with a substantially ovally shaped outlet 26c, arranged in a curved manner adjacent and in radially disposed relationship about rotor shaft 13. The central axes of the inlet and outlet are thus seen to be located in substantial parallel relationship with respect to the axis of rotor shaft 13.

The first passage means preferably comprises a substantially uniform or constant cross-sectional area throughout its length to alleviate fluid turbulence, cavitation and noise problems. In addition, circularly shaped inlet 26a facilitates attachment thereof to a standard hose connection.

As more clearly shown in FIG. 2, outlet 26c is orientated to discharge a large portion of the fluid in a substantially tangential direction relative to vertically disposed planes of rotor rotation. Preferably, approximately one-half of the incoming fluid is directed through apertures 16d to the side of the rotor opposite inlet 26c. Conventional piston ring seals 29 and 30 may be arranged between the hub portion of the rotor and housing 17 to maintain a minimum leakage thereby during retarder operation.

It should be noted that efficient fluid circulation is further aided by the construction and arrangement of a split second passage means, formed in part by surfaces 17g and 17h of housing 17. The surfaces are preferably arranged to converge towards each other in a radially outward direction and cooperate with the juxtaposed surfaces of the rotor, tapered in a like manner, to form the second passage means 26d.

The second passage means also preferably comprise a substantially uniform cross-sectional area from inlet 26c to stator pockets 17d, i.e., the cross-sectional area thereof decreases in a direct and predetermined proportion to the radial distance thereof from the axis of rotor-shaft 13. As above suggested, such a uniform flow path reduces the tendency towards buildup of turbulent boundary layers, alleviates fluid cavitation and substantially prevents undue noises. Curved surface portion 16c on the web allows a smooth directional change of fluid flow to radial passage 26d adjacent outlet 26c in a substantially tangential manner. It should be further noted that a curved surface portion 17k is preferably formed on the housing to receive fluid in a substantially tangential manner from apertures 16d and direct the fluid smoothly and tangentially to radial passage 26d communicating therewith.

The above described second passage means communicates fluid to stator pockets 17d whereat the retarding function occurs. Upon rotation of rotor 16, blades 16e discharge fluid to a substantially circular outlet chamber 26e. As more clearly illustrated in FIG. 2, the rotor terminates radially outwardly to form the circumventing outlet chamber with flange portion 17b of housing 17.

The outlet chamber communicates with an outlet passage having an entrance 26f forming a substantially rectangular cross-section, arranged to receive fluid substantially tangentially from the outlet chamber. The cross-sectional area of the outlet chamber increases gradually in a counter-clockwise direction in FIG. 2, from and towards outlet passage 26f. Preferably such a cross-section increases to substantially twice its original area. Such an arrangement further aids in providing a non-turbulent fluid flow.

Entrance 26f is arranged to communicate fluid to an outlet 26h via a conically shaped diffusing section 26g (FIG. 3). The diffusing section functions to increase the fluid's static head to further improve fluid circulation for cooling purposes. Outlet 26h may be suitably connected to valve means (not shown) and a heat exchanger (not shown) to cool the fluid.

I claim:

1. In a hydrodynamic retarder comprising a bladed rotor mounted on a rotatable shaft and a stationary housing enclosing said rotor to form a chamber adapted to be filled with a fluid, said housing having stator pockets arranged adjacent the bladed portion of said rotor in said chamber, a fluid passage means formed through said housing, the entire length thereof being of uniform cross-sectional area for communicating fluid to said chamber, said passage means comprising a circularly shaped inlet and a substantially oval shaped outlet, said outlet arranged adjacent to said shaft remote from said stator pockets.

2. The invention of claim 1 comprising further passage means formed in said housing and having a substantially uniform cross-sectional area communicating the outlet of said fluid passage with said stator pockets.

3. The invention of claim 1 wherein central axes of the inlet and the outlet of said passage means are arranged in substantial parallel relationship with respect to an axis of said shaft and wherein said passage means comprises a curved portion communicating said inlet with said outlet.

4. The invention of claim 1 wherein said outlet further comprises a curved cross-section, radially disposed about said shaft.

5. The invention of claim 1 wherein said rotor terminates radially outwardly to form a substantially circular outlet chamber with said housing arranged to circumvent said rotor, said outlet chamber arranged to communicate with said retarder chamber and an outlet passage arranged to receive fluid substantially tangentially from said outlet chamber upon rotation of said rotor, said outlet chamber further arranged to gradually increase in cross-sectional area in a circular direction from and towards said outlet passage.

6. The invention of claim 5 wherein said outlet passage is constructed and arranged to gradually change in shape from a substantially rectangular cross-section adjacent said outlet chamber to a substantially circular cross-section.

7. The hydrodynamic retarder of claim 1 including an input shaft arranged to drive said rotor shaft, said rotor shaft mounted in bearing means arranged in said housing, said rotor shaft arranged to drive an output shaft, said rotor mounted on said rotor shaft substantially midway between said bearing means in the location whereat said input shaft drives said rotor shaft.

8. The invention of claim 7 wherein said stator pockets in said housing comprise first and second juxtaposed series in radially disposed position about the axis of rotation of said rotor shaft, said housing comprising a plate portion arranged adjacent to said input shaft and having the first series of stator cups arranged thereon and a cup shape member secured to said plate portion by a flange portion thereof, said flange portion arranged to circumvent said rotor.

9. The invention of claim 8 further comprising another housing arranged to enclose said first housing and secured thereto, said bearing means arranged in spaced relationship to mount said rotor shaft on said first and second housings and a gear mounted on said rotor shaft between said bearing means.

10. A hydrodynamic retarder comprising a rotor shaft arranged to rotate about an axis and having a rotor mounted thereon, said rotor comprising a hub portion attached to said rotor shaft, a radially disposed web portion arranged substantially perpendicularly relative to said axis and a curved portion connecting said web portion to said hub portion, said curved portion arranged to locate said web portion in axially offset relationship with respect to the location whereat said web portion connects to said hub portion, said curved portion having a plurality of arcuately shaped apertures formed therein radially disposed about said axis, a plurality of blades secured radially outwardly on opposite sides of said web portion, a fixed housing arranged to substantially enclose said rotor comprising a cup-shaped portion having a flange portion secured to a plate portion, said cup-shaped and plate portions each having a plurality of stator cups arranged thereon in juxtaposed relationship to said blades and wherein the cup-shaped portion of said housing has a first passage means formed therein comprising a circular inlet and a substantially oval-shaped outlet, said outlet being formed in the cup-shaped portion of said housing and arranged in a curved manner to be in substantial juxtaposed relationship to the curved portion of said rotor, said passage having a constant cross-sectional area.

11. The invention of claim 10 wherein juxtaposed surfaces of said housing and web portion of said rotor form tapered second passage means on each side of said rotor arranged to communicate said outlet with said stator cups and having substantially constant cross-sectional areas and a curved surface portion formed on the plate portion of said housing arranged to receive fluid from said apertures and direct the fluid to the portion of said second passage means communicating therewith.

References Cited

UNITED STATES PATENTS

| | | |
|---|---|---|
| 1,249,261 | 12/1917 | Walker. |
| 2,185,491 | 1/1940 | Anderson et al. _____ 188—90 |
| 2,287,130 | 6/1942 | Ramey _____ 188—90 |
| 2,425,885 | 8/1947 | Jennings _____ 60—54 X |
| 2,452,550 | 11/1948 | Cline _____ 188—90 |
| 2,768,711 | 10/1956 | Cline _____ 188—90 |
| 3,095,820 | 7/1963 | Sanborn et al. ____ 188—90 X |
| 3,171,513 | 2/1965 | Black et al. _____ 188—90 |

MILTON BUCHLER, *Primary Examiner.*

G. E. HALVOSA, *Assistant Examiner.*